No. 898,280. PATENTED SEPT. 8 1908.
I. SNELL.
VEHICLE WHEEL.
APPLICATION FILED OCT. 22, 1907.

WITNESSES
Joshua Bergstrom
C. W. Fairbank

INVENTOR
Irving Snell
BY
Munn & Co.
ATTORNEYS

UNITED STATES PATENT OFFICE.

IRVING SNELL, OF LITTLE FALLS, NEW YORK.

VEHICLE-WHEEL.

No. 898,280.  Specification of Letters Patent.  Patented Sept. 8, 1908.

Application filed October 22, 1907. Serial No. 398,556.

*To all whom it may concern:*

Be it known that I, IRVING SNELL, a citizen of the United States, and a resident of Little Falls, in the county of Herkimer and State of New York, have invented a new and Improved Vehicle-Wheel, of which the following is a full, clear, and exact description.

This invention relates to certain improvements in vehicle wheels, and more particularly to a tire or rim construction designed for use in place of the pneumatic tires commonly employed.

My wheel involves certain new features of construction whereby I secure the maximum elasticity, strength and durability, and, at the same time, prevent the wheel from skidding.

Figure 1:
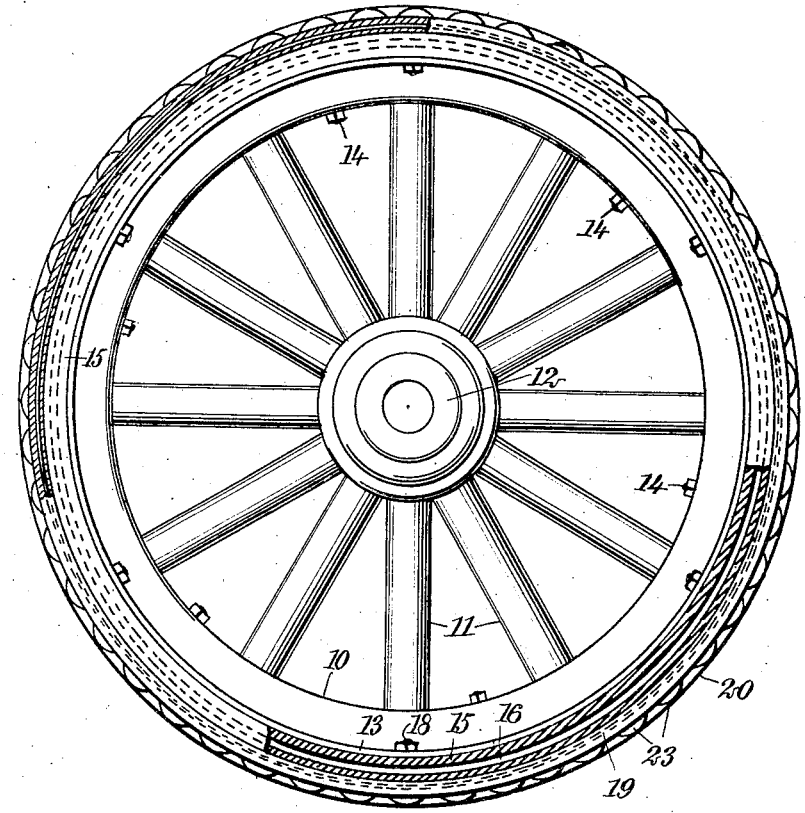
Figure 2:
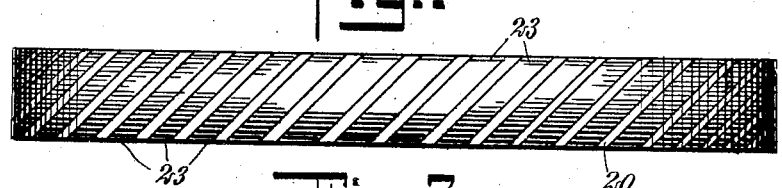
Figure 3:
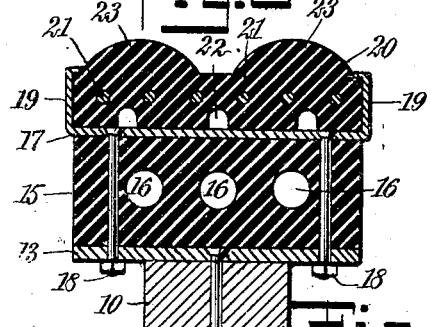

Reference is to be had to the accompanying drawings, forming a part of this specification, in which similar characters of reference indicate corresponding parts in all the figures, and in which Figure 1 is a side elevation of a wheel constructed in accordance with my invention, and having a portion broken away to more clearly show certain details thereof; Fig. 2 is an edge view of the wheel; and Fig. 3 is a transverse section through a portion of the rim or tire.

In my improved wheel I employ the ordinary wooden felly 10 connected by any suitable form of spokes 11 to the hub 12. The details of the felly, spokes and hub may be varied at will, as they constitute no portion of my invention. Outside of the felly I provide a steel band 13 of a width somewhat greater than the width of the wooden felly and rigidly secured thereto by a plurality of radially-disposed bolts 14. Surrounding the steel band 13, I provide a band 15 of rubber or any elastic material and of substantially the same width as the metal band 13. The rubber band 15 may be of any desired thickness to secure the required resiliency. To increase the resiliency the band may be provided with a plurality of annular passages 16 extending longitudinally of the band and around the wheel. Outside of the resilient band 15, I provide a second steel band 17 of substantially the same width as the first-mentioned steel band 13 and connected thereto by a plurality of radially-disposed bolts 18 which pass through openings in the resilient band 15. The outer ends of the bolts are countersunk, so as to lie flush with the outer surface of the band 17, while the inner ends of the bolts carry nuts disposed upon the inner surface of the band 13 and adjacent the felly 10. These bolts hold the two bands against side movement in respect to each other and limit the distortion of the outer band but do not interfere with the compression of the intermediate resilient band 15.

The outer band 17 is provided with radially-disposed flanges 19 upon opposite sides thereof, serving to hold in place a second resilient band 20. This band may be of the same material as the first-mentioned band, or may be somewhat harder to better resist the wear. The band 20 is provided with annular passages corresponding to the annular passages 16 of the inner band, and within each passage there is provided a wire 21 serving to prevent the outer band from stretching and becoming detached from the metal band 17. For increasing the resiliency of the outer band, the latter may be provided with annular grooves 22 upon its inner surface, adjacent said metallic band, and for preventing the wheel from skidding and for increasing the resistance to slipping, the band is preferably provided with a plurality of ridges 23 upon its outer surface. These ridges may extend in any desired direction in respect to the body portion of the band, but are preferably set at an angle to the plane of the band, as shown in Fig. 2. The wires 21 serve to hold the band in position and prevent it from stretching, while the flanges 19 limit the compressibility of the band and prevent its side movement. These flanges are preferably provided with inturned edges engaging with the outer surface of the band to additionally protect the band and hold the side portions thereof in position.

The specific form above described comprises only one embodiment of my invention.

Various changes in construction may be made, without departing from the spirit of my invention and within the scope of the claim.

Having thus described my invention, I claim as new and desire to secure by Letters Patent:

A vehicle wheel having a felly, a metallic band encircling the felly and rigidly secured thereto and of a width greater than said felly, a resilient band encircling said metallic band and having a plurality of cavities or openings therein, a second metallic band encircling said resilient band and connected to said first-mentioned metallic band, a second resilient band encircling the second metallic band and having a plurality of ridges on its peripheral surface, means carried by said last-mentioned metallic band for engagement with the last-mentioned resilient band for preventing lateral movement of the latter, and a plurality of wires embedded within said last-mentioned resilient band and encircling the wheel.

In testimony whereof I have signed my name to this specification in the presence of two subscribing witnesses.

IRVING SNELL.

Witnesses:
 F. G. TEALL,
 L. O. BENKLIN.